(12) United States Patent
Uchimura et al.

(10) Patent No.: US 11,208,008 B2
(45) Date of Patent: Dec. 28, 2021

(54) CONTROL DEVICE FOR VEHICLE

(71) Applicant: SUBARU CORPORATION, Tokyo (JP)

(72) Inventors: Takahiro Uchimura, Tokyo (JP); Yuji Ohori, Tokyo (JP); Yuki Natsume, Tokyo (JP); Shota Inudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 220 days.

(21) Appl. No.: 16/700,789

(22) Filed: Dec. 2, 2019

(65) Prior Publication Data
US 2020/0231065 A1 Jul. 23, 2020

(30) Foreign Application Priority Data

Jan. 22, 2019 (JP) .............................. JP2019-008175

(51) Int. Cl.
*B60L 58/20* (2019.01)
*B60L 3/00* (2019.01)
*B60W 30/09* (2012.01)
*B60Q 1/52* (2006.01)
*G08G 1/16* (2006.01)
*B60W 30/095* (2012.01)

(52) U.S. Cl.
CPC ............ *B60L 58/20* (2019.02); *B60L 3/0007* (2013.01); *B60Q 1/525* (2013.01); *B60W 30/09* (2013.01); *B60W 30/0956* (2013.01); *G08G 1/162* (2013.01); *B60L 2250/10* (2013.01)

(58) Field of Classification Search
CPC .... B60L 58/20; B60L 3/0007; B60L 2250/10; G08G 1/162; G08G 1/166; B60K 6/48; B60K 2006/4825; B60W 10/06; B60W 20/15; B60W 30/09; B60W 30/0956; B60W 30/095; Y02T 10/70; Y02T 10/62; B60Q 9/008; B60Q 1/525
USPC ....................................................... 701/301
See application file for complete search history.

(56) References Cited

U.S. PATENT DOCUMENTS

2010/0010723 A1  1/2010 Taki et al.

FOREIGN PATENT DOCUMENTS

| JP | 2008-121583 A | 5/2008 |
| JP | 2013-53559 A | 3/2013 |
| JP | 2017-219023 A | 12/2017 |

*Primary Examiner* — Maceeh Anwari
(74) *Attorney, Agent, or Firm* — McDermott Will & Emery LLP

(57) ABSTRACT

A control device for a vehicle predicts a collision of the vehicle with an object and then actuates a drive assist device. The control device includes a collision predictor, a drive assist controller, an engine controller, a first power supply system, a second power supply system, a switch, and a switch controller. When a possibility that the vehicle will collide with the object exceeds a threshold, the collision predictor outputs a collision alarm signal. When the collision alarm signal is output during driving of the starter motor, the engine controller stops the starter motor to increase an electric potential of the second power supply system, and the switch controller turns on the switch, based on a difference in electric potential between the first and second power supply systems.

13 Claims, 13 Drawing Sheets

CONTROL DEVICE FOR VEHICLE

CROSS-REFERENCE TO RELATED APPLICATIONS

The present application claims priority from Japanese Patent Application No. 2019-008175 filed on Jan. 22, 2019, the entire contents of which are hereby incorporated by reference.

BACKGROUND

The disclosure relates to a control device for a vehicle that predicts the collision between the vehicle and an object and then actuates a drive assist device.

Some modern drive assist systems monitor an area surrounding a vehicle by using a millimeter-wave radar device, an infrared laser device, a stereoscopic camera, a monocular camera, or another sensing device and, if there is a possibility that the vehicle will collide with an object, activate an automatically braking or steering system, for example, as disclosed in Japanese Unexamined Patent Application Publication Nos 2017-219023, 2013-53559, and 2008-121583.

SUMMARY

An aspect of the disclosure provides a control device to be installed in a vehicle. The control device is configured to predict a collision of the vehicle with an object and then actuates a drive assist device. The control device includes a collision predictor, a drive assist controller, an engine controller, a first power supply system, a second power supply system, a switch, and a switch controller. The collision predictor is configured to, when a possibility that the vehicle will collide with the object exceeds a threshold, output a collision alarm signal. When the collision alarm signal is output from the collision predictor, a drive assist controller is configured to actuate an electrical actuator in the drive assist device. When a stop condition is satisfied, an engine controller is configured to stop an engine. When a start-up condition is satisfied, the engine controller is configured to drive a starter motor to start up the engine. The first power supply system includes a first power supply that includes a first power storage and the electrical actuator coupled to the first power supply. The second power supply system includes a second power supply that includes a second power storage and the starter motor coupled to the second power supply. The switch is configured to be turned on or off, and disposed between the first and second power supply systems. The switch controller is configured to, when the starter motor is driven to start up the engine, turn off the switch. When the collision alarm signal is output during driving of the starter motor, the engine controller stops the starter motor to increase an electric potential of the second power supply system, and the switch controller turns on the switch, based on a difference between the electric potential of the second power supply system and an electric potential of the first power supply system.

An aspect of the disclosure provides a control device to be installed in a vehicle. The control device is configured to predict a collision of the vehicle with an object and then actuates a drive assist device. The control device includes a first power supply system, a second power supply system, a switch, and circuitry. The first power supply system includes a first power supply that includes a first power storage and an electrical actuator coupled to the first power supply. The second power supply system includes a second power supply that includes a second power storage and a starter motor coupled to the second power supply. The switch is configured to be turned on or off, and disposed between the first power supply system and the second power supply system. The circuitry is configured to, when a possibility that the vehicle will collide with the object exceeds a threshold, output a collision alarm signal. The circuitry is configured to, when the collision alarm signal is output, actuate an electrical actuator in the drive assist device. The circuitry is configured to, when a stop condition is satisfied, stop an engine and, when a start-up condition is satisfied, drive the starter motor to start up the engine. The circuitry is configured to, when the starter motor is driven to start up the engine, turn off the switch. When the collision alarm signal is output during driving of the starter motor, the circuitry stops the starter motor to increase an electric potential of the second power supply system, and turns on the switch, based on a difference between the electric potential of the second power supply system and an electric potential of the first power supply system.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Driving assist systems are equipped with some electrical actuators, including: a brake actuator that controls a liquid pressure of a brake caliper; and a steering actuator that operates a steering mechanism. When such an electrical actuator automatically brakes or steers, it consumes a considerably large amount of electric power. More specifically, to avoid the collision between vehicles, the electrical actuator sharply operates by increasing its power consumption. If the amount of electric power supplied to the electrical actuator is insufficient, the drive assist device may malfunction. Therefore, to cause the drive assist device to operate properly, it is necessary to supply a sufficient amount of electric power to the electrical actuator.

It is desirable to provide a control device for a vehicle that can supply a sufficient amount of electric power to an electrical actuator in a drive assist device, thereby causing the drive assist device to operate properly.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

[Configuration of Vehicle]

Figure 1:
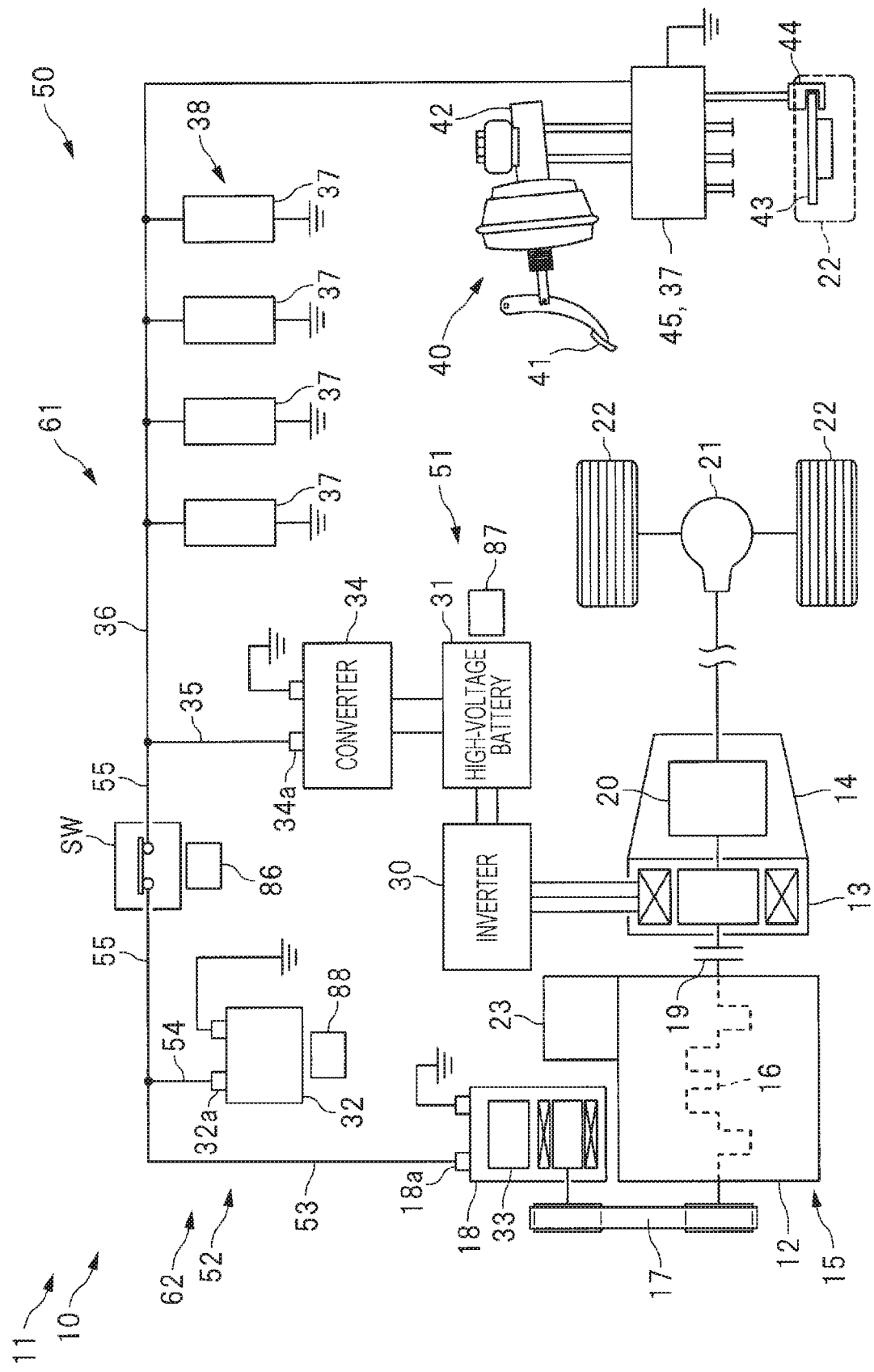
FIG. 1 schematically illustrates an example of a configuration of a vehicle equipped with a control device for a vehicle according to an embodiment of the disclosure.

FIG. 1 schematically illustrates an example of a configuration of a vehicle 11 equipped with a control device 10 according to an embodiment of the disclosure. As illustrated in FIG. 1, the vehicle 11 is equipped with a power train 15 including an engine 12, a motor generator 13, and a transmission 14. The engine 12 has a crankshaft 16, a first end of which is coupled to a starter generator 18 via a belt mechanism 17 and a second end of which is coupled to the motor generator 13 via a clutch mechanism 19. The motor generator 13 is coupled to a variable-speed mechanism 20 in the transmission 14, and the variable-speed mechanism 20 is coupled to wheels 22 via a differential mechanism 21 and other members. The engine 12, which may be an internal combustion engine, has an engine accessory 23 including an injector and an ignitor.

The motor generator 13 provided in the power train 15 is coupled to a high-voltage battery 31 via an inverter 30. The high-voltage battery 31 may be, for example, a lithium ion battery or a lead battery with a terminal voltage of about 100 V. The motor generator 13, when being in a power running state, is supplied with the electric power from the high-voltage battery 31 and transmits motor power to the wheels 22, thereby driving the wheels 22. Then, the motor generator 13, when being in a power generation mode during the deceleration of the vehicle 11, supplies electric power to the high-voltage battery 31, thereby charging the high-voltage battery 31.

The starter generator 18 coupled to the engine 12 is also coupled to a low-voltage battery 32. The low-voltage battery 32 may be, for example, a lithium ion battery or a lead battery with a terminal voltage of about 12 V. The starter generator 18 may be an integrated starter generator (ISG) that serves as a generator and a motor. For example, when the remaining charged amount, or the state of charge (SOC), of the low-voltage battery 32 decreases below a preset lower limit, the starter generator 18 enters a power generation state. When starting rotating the engine 12 or when assisting the engine 12 in starting moving or accelerating the vehicle 11, the starter generator 18 enters a power running state. The starter generator 18 has an ISG controller 33 to regulate an electric current supplied to a starter coil or a field coil. The ISG controller 33 may include an inverter, a regulator, a microcomputer, and various sensors.

When the clutch mechanism 19 disposed between the engine 12 and the motor generator 13 is disengaged, the transmission of the power generated by the motor generator 13 is not transmitted to the engine 12. As a result, the motor generator 13 solely runs the vehicle 11 so that the vehicle 11 runs in a motor mode, which is one type of its running mode. When the clutch mechanism 19 is engaged, the power of the motor generator 13 is transmitted to the engine 12. As a result, both the engine 12 and the motor generator 13 run the vehicle 11 in combination with each other so that the vehicle 11 runs in a parallel mode, which is another one type of the running mode. In this way, the vehicle 11 runs both in the motor mode and in the parallel mode. It should be noted that both of the engine 12 and the motor generator 13 do not necessarily have to run the vehicle 11 in the parallel mode. Alternatively, the motor generator 13 may enter an idle state, and the engine 12 may solely run the vehicle 11.

The vehicle 11 includes a brake system 40 that decreases the number of rotations of the wheels 22 or stops the rotation of the wheels 22. The brake system 40 includes: a brake pedal 41 to be operated by an occupant of the vehicle 11; and a master cylinder 42 that generates a braking liquid pressure in accordance with the operational amount of the brake pedal 41. Furthermore, the brake system 40 includes: a disc rotor 43 fixed to the wheels 22; and a caliper 44 that presses a braking pad against the disc rotor 43 to decrease the number of rotations of the wheels 22 or to stop the rotation of the wheels 22. The caliper 44 is coupled to the master cylinder 42 via a brake actuator 45 that adjusts the braking liquid pressure. The brake system 40 automatically brakes when there is a possibility that the vehicle 11 will collide with an object. When there is a possibility that the vehicle 11 will collide with an object, a main controller 70, details of which will be described later, causes the brake actuator 45 to increase the braking liquid pressure applied to the caliper 44 independently of the operation of the brake pedal 41. The vehicle 11 thereby automatically and sharply stops running. The brake actuator 45 may include an unillustrated electrical pump, accumulator, and magnetic valve.

[Power Circuit]

As illustrated in FIG. 1, the motor generator 13 is coupled to the high-voltage battery 31 via the inverter 30. The high-voltage battery 31 is coupled to a converter 34 that converts the voltage of the high-voltage battery 31. The converter 34 has a positive electrode terminal 34a coupled to a positive line 35, which is joined to a positive line 36. The positive line 36 is linked to an electrical apparatus group 38, which includes a plurality of electrical apparatuses 37 each of which serves as any given actuator or controller, for example. The brake actuator 45 in the brake system 40 corresponds to one of the electrical apparatuses 37 in the electrical apparatus group 38.

The control device 10 is equipped with a power circuit 50 having a first power supply system 61. Components of the first power supply system 61 in the power circuit 50 are the motor generator 13, the inverter 30, the high-voltage battery 31, the converter 34, the brake actuator 45, and the electrical apparatuses 37. In short, the first power supply system 61 includes a first power supply 51 and the brake actuator 45 coupled to the first power supply 51; the first power supply 51 includes the high-voltage battery 31. In one embodiment, the high-voltage battery 31 may serve as a "first power storage", and the brake actuator 45 may serve as an "electrical actuator". As illustrated in FIG. 1, the first power supply 51 is equipped with the converter 34.

The starter generator 18 has a positive electrode terminal 18a coupled to a positive line 53. The low-voltage battery 32 has a positive electrode terminal 32a coupled to a positive line 54, which is joined to the positive line 53. The power circuit 50 provided in the control device 10 is equipped with a second power supply system 62 that includes: a second power supply 52 with the low-voltage battery 32; and a starter generator 18 coupled to the second power supply 52. In one embodiment, the low-voltage battery 32 may serve as a "second power storage", and the starter generator 18 may serve as a "starter motor".

Disposed between the first power supply system 61 and the second power supply system 62 described above is a current-carrying line 55 via which the first power supply system 61 is coupled in parallel to the second power supply system 62. On the current-carrying line 55 is a switch SW that is turned on or off. When the switch SW is in an ON state, the first power supply system 61 is coupled to the second power supply system 62, whereas when the switch SW is in an OFF state, the first power supply system 61 is separated from the second power supply system 62.

The switch SW may be a semiconductor switch made of a metal oxide semiconductor field effect transistor (MOSFET), for example. Alternatively, the switch SW may be a mechanical switch that is turned on or off by means of electromagnetic force. The "ON state" of the switch SW refers to a state where the contact points of the switch SW are in contact with each other and an electric current can flow therebetween. The "OFF state" of the switch SW refers to a state where the contact points are separated from each other and no electric current can flow therebetween. The switch SW may be a relay or a contactor, for example.

[Control System]

Figure 2:
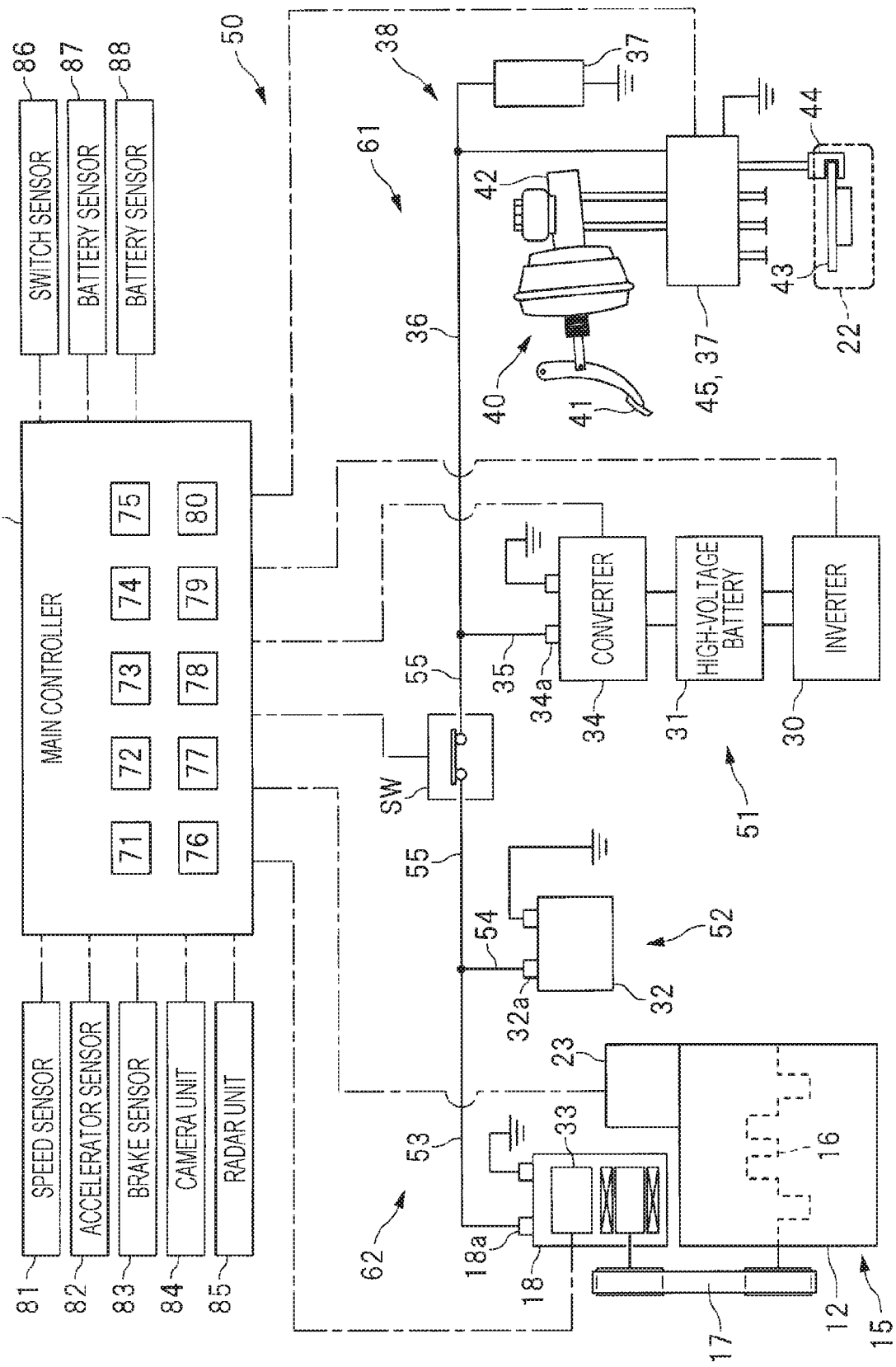
FIG. 2 illustrates an example of a power circuit and a control system provided in the control device.

FIG. 2 illustrates an example of the power circuit 50 and a control system provided in the control device 10. As illustrated in FIG. 2, the control device 10 is equipped with the main controller 70 to cause the power train 15, the power circuit 50, and other members to operate in collaboration with one another. The main controller 70 may be a microcomputer, for example. The main controller 70 includes a mode setting unit 71, an engine controller 72, a motor controller 73, an ISG controller 74, a converter controller 75, a switch controller 76, and a clutch controller 77. The mode setting unit 71 sets the running mode of the vehicle 11 in accordance with a running status of the vehicle 11; the engine controller 72 controls an operation of the engine 12; the motor controller 73 controls an operation of the motor generator 13; the ISG controller 74 controls an operation of the starter generator 18; the converter controller 75 controls an operation of the converter 34; the switch controller 76 controls an operation of the switch SW; and the clutch controller 77 controls an operation of the clutch mechanism 19.

The brake system 40 in the control device 10 automatically brakes. In one embodiment, the brake system 40 may serve as a drive assist device. As described above, the main controller 70, which controls the operation of the brake system 40, activates the brake actuator 45 to automatically stop the vehicle 11 when predicting that the control device 10 would collide with a forward vehicle 100 or other object. The main controller 70 further includes a collision predictor 78, an alarm controller 79, and a brake controller 80. The collision predictor 78 predicts the collision of the vehicle 11 with the forward vehicle 100 or the object. The alarm controller 79 gives an alarm to the occupant, based on the result of the prediction. The brake controller 80 controls an operation of the brake actuator 45, based on the result of the prediction. In one embodiment, the alarm controller 79 may serve as a "drive assist controller", and the brake controller 80 may serve as a "drive assist controller".

The main controller 70, the ISG controller 33, the inverter 30, the converter 34, the engine accessory 23, the brake actuator 45, and some other members are coupled to one another over an on-board network, such as a controller area network (CAN) or a local interconnect network (LIN), so that these members can mutually communicate with one another. Moreover, the main controller 70 is coupled to a speed sensor 81, an accelerator sensor 82, a brake sensor 83, a camera unit 84, and a radar unit 85. The speed sensor 81 detects a speed of the vehicle 11; the accelerator sensor 82 detects the operational amount of the accelerator pedal; the brake sensor 83 detects the operational amount of the brake pedal 41; the camera unit 84 captures an image of a scene in front of the vehicle 11; and the radar unit 85 detects presence of the forward vehicle 100 or an object in front of the vehicle 11. The main controller 70 is further coupled to a switch sensor 86, a battery sensor 87, and a battery sensor 88. The switch sensor 86 detects a voltage applied across the switch SW; the battery sensor 87 detects a charge or discharge electric current, a terminal voltage, an SOC, and other factors of the high-voltage battery 31; and the battery sensor 88 detects a charge or discharge electric current, a terminal voltage, an SOC, and other factors of the low-voltage battery 32. The "SOC" that indicates a charged state of a battery refers to a percentage of a remaining charged amount of the battery. Note that the "SOC" of the battery can be defined as a ratio of a charged amount to fully charged capacity of the battery.

[Motor and Parallel Modes]

Figure 3:
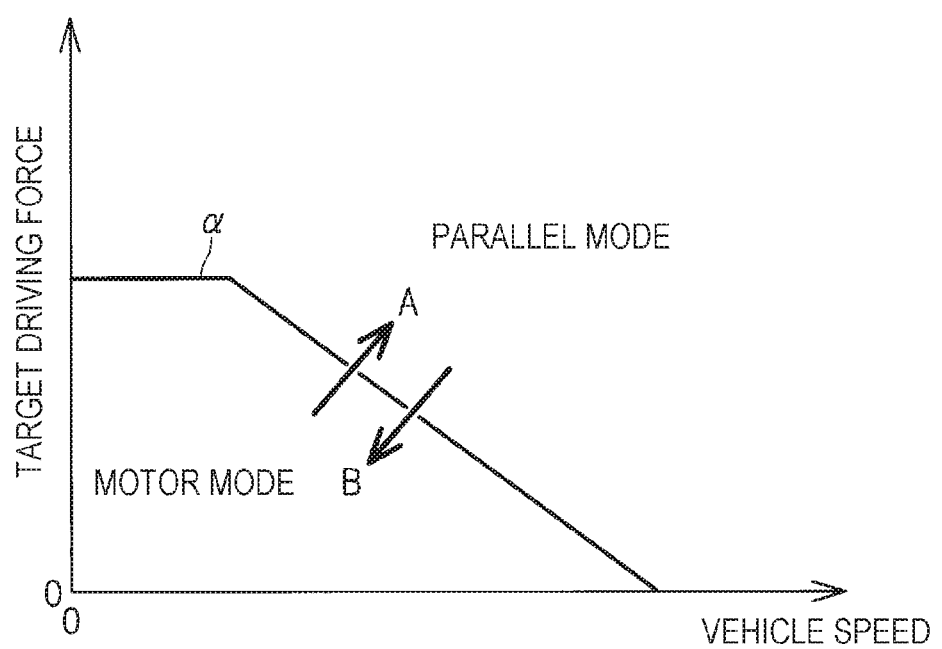
FIG. 3 is a mode map illustrating an example of zones in which a motor mode and a parallel mode are set.

As described above, the vehicle 11 can run in two running modes: the motor and parallel modes. The vehicle 11 runs in the motor mode by using the motor generator 13, whereas the vehicle 11 runs in the parallel mode by using both the engine 12 and the motor generator 13. FIG. 3 is a mode map illustrating an example of zones in which the motor mode and the parallel mode are set. In this mode map, a switching threshold α is preset in accordance with a vehicle speed.

As indicated by the arrow A in FIG. 3, the target drive power at a certain vehicle speed increases above the switching threshold α, the clutch mechanism 19 is engaged and the engine 12 starts up, so that the main controller 70 switches the running mode from the motor mode to the parallel mode. In short, when the target drive power at a certain vehicle speed exceeds the switching threshold α, the start-up condition for the engine 12 is satisfied, and the main controller 70 sets the engine 12 to an operational state. As indicated by the arrow B, the target drive power at a certain vehicle speed decreases below the switching threshold α, the clutch mechanism 19 is disengaged and the engine 12 stops, so that the main controller 70 switches the running mode from the parallel mode to the motor mode. In short, when the target drive power at a certain vehicle speed decreases below the switching threshold α, the stop condition for the engine 12 is satisfied, and the main controller 70 sets the engine 12 to a stop state.

The target drive power for the vehicle 11 may be set in accordance with the operational amount or speed of the accelerator pedal. As an example, when the accelerator pedal is operated in a larger amount, the target drive power may be set to a greater value, whereas when the accelerator pedal is operated in a smaller amount, the target drive power may be set to a lower value. As an alternative example, when the accelerator pedal is operated at a higher speed, the target drive power may be set to a greater value, whereas when the accelerator pedal is operated at a lower speed, the target drive power may be set to a lower value.

The mode setting unit 71 in the main controller 70 refers to a mode map as illustrated in FIG. 3 and determines whether of the motor and parallel modes are to be employed as the running mode. Based on the determined running mode, the mode setting unit 71 outputs control signals to the engine controller 72, the motor controller 73, the ISG controller 74, and the clutch controller 77. In response to these control signals, the mode setting unit 71, the engine controller 72, the motor controller 73, the ISG controller 74, and the clutch controller 77 in the main controller 70 control the operations of the engine 12, the motor generator 13, the starter generator 18, and the clutch mechanism 19 in such a way that the vehicle 11 runs in the determined running mode.

[Power Supply Status for Electrical Apparatuses]

Figure 4:
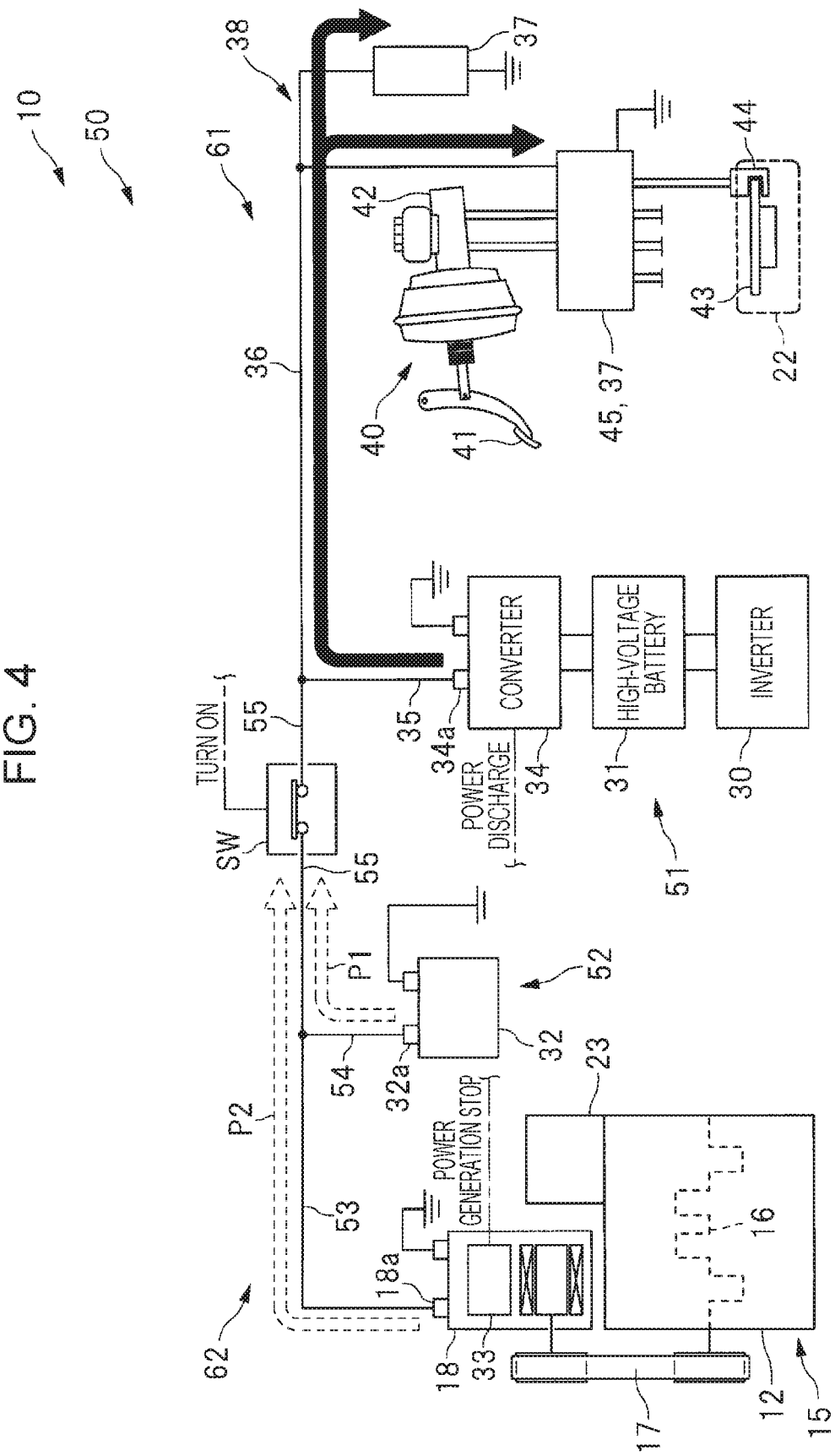
FIG. 4 illustrates an example of a power supply status in a regular mode.
Figure 5:
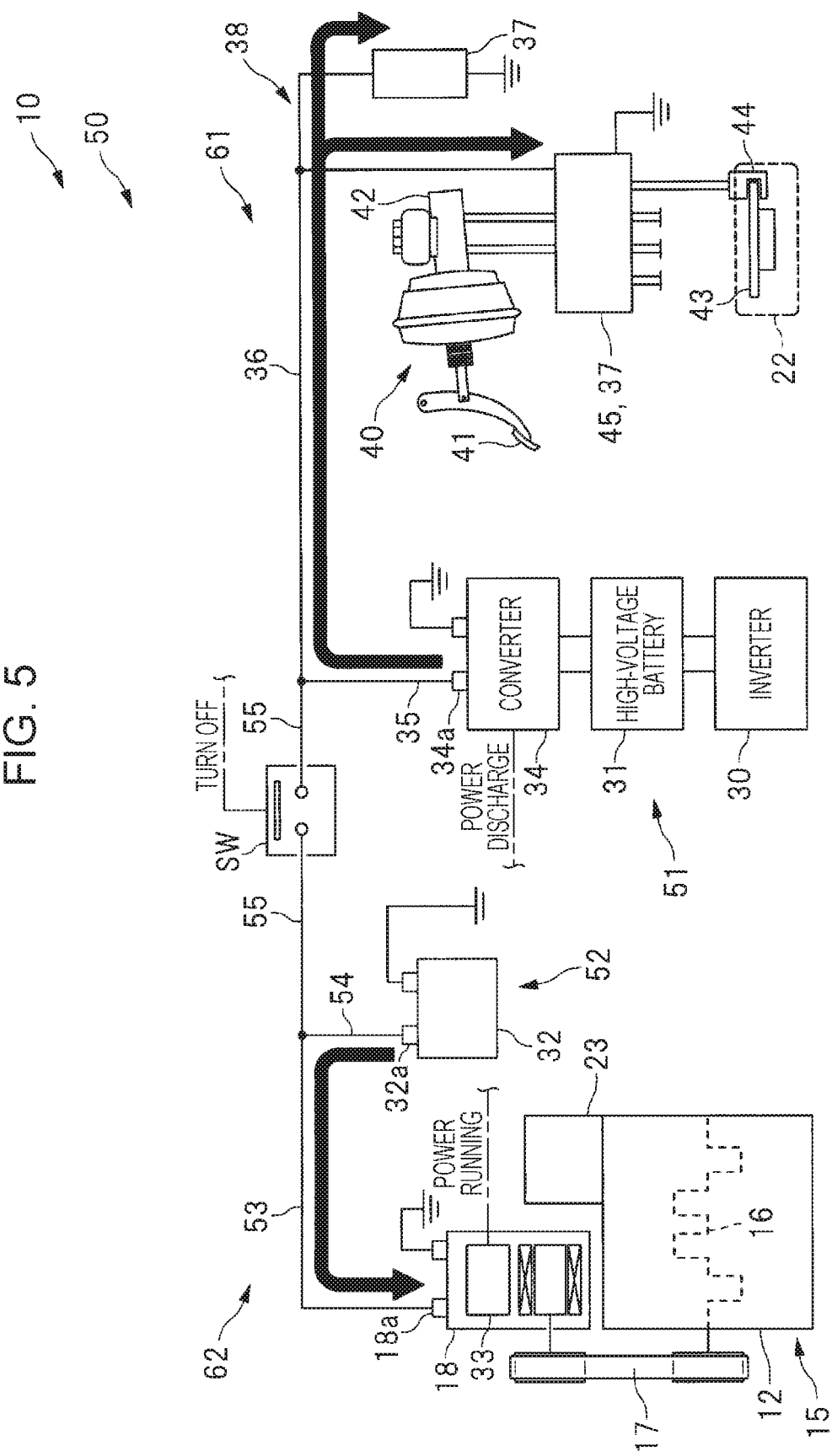
FIG. 5 illustrates an example of a power supply status in an engine start-up mode.

Next, a description will be given below of a power supply status for the electrical apparatuses 37. The main controller 70 switches the power supply mode for the electrical apparatuses 37 between a regular mode and an engine start-up mode. In the regular mode, the switch SW is turned on to couple the first power supply system 61 to the second power supply system 62. In the engine start-up mode, the switch SW is turned off to separate the first power supply system 61 from the second power supply system 62. FIG. 4 illustrates an example of the power supply status in the regular mode; FIG. 5 illustrates an example of the power supply status in the engine start-up mode. In each of FIGS. 4 and 5, the black arrow indicates the power supply status.

As illustrated in FIG. 4, to execute the regular mode, the main controller 70 instructs the converter 34 to discharge electric power. In response to the instruction, the converter 34 causes the high-voltage battery 31 to supply electric power to the electrical apparatuses 37 while adjusting a discharge voltage to a target voltage. Simultaneously, the main controller 70 instructs the starter generator 18 to stop generating electric power. In short, the regular mode corresponds to the power supply mode in which the first power supply 51 supplies the electric power to the electrical apparatuses 37. In addition, the main controller 70 turns on the switch SW to couple the first power supply system 61 to the second power supply system 62 via the switch SW. As a result, if the electrical apparatuses 37 temporarily consume larger amounts of electric power, the low-voltage battery 32 supplies the electric power to the electrical apparatuses 37. This configuration helps stable application of the voltage to the electrical apparatuses 37.

When the main controller 70 executes the regular mode, the first power supply 51 does not necessarily have to supply the electric power to the electrical apparatuses 37 as in FIG. 4. As an alternative example, the second power supply 52 may supply the electric power to the electrical apparatuses 37. In this case, the low-voltage battery 32 may supply the electric power to the electrical apparatuses 37, as indicated by the dotted arrow P1 in FIG. 4. As a result, the converter 34 may stop discharging the electric power, and the starter generator may stop generating the electric power. As another alternative example, the starter generator 18 may supply the electric power to the electrical apparatuses 37, as indicated by the dotted arrow P2 in FIG. 4. In this case, the starter generator 18 may generate the electric power, but the converter 34 may stop discharging the electric power.

Next, the engine start-up mode will be described below. This engine start-up mode refers to the power supply mode in which the control device 10 operates when the starter generator 18 enters the power running state to start up the engine 12, in other words, when the vehicle 11 switches from the motor mode to the parallel mode. As illustrated in FIG. 5, to execute the engine start-up mode, the main controller 70 instructs the converter 34 to discharge the electric power, turns off the switch SW, and instructs the starter generator 18 to enter the power running state. Thus, when the starter generator 18 is driven to start up the engine 12, the main controller 70 turns off the switch SW to separate the first power supply system 61 from the second power supply system 62. This configuration stops the electric power from being supplied from the first power supply system 61 to the starter generator 18 when the starter generator 18 consumes a larger amount of electric power in response to a cranking operation. It is thus possible to reduce the risk of the first power supply system 61 instantaneously applying a lower voltage to the electrical apparatuses 37, thereby helping the electrical apparatuses 37 operate properly.

[Automatic Braking Control]

Figure 6:
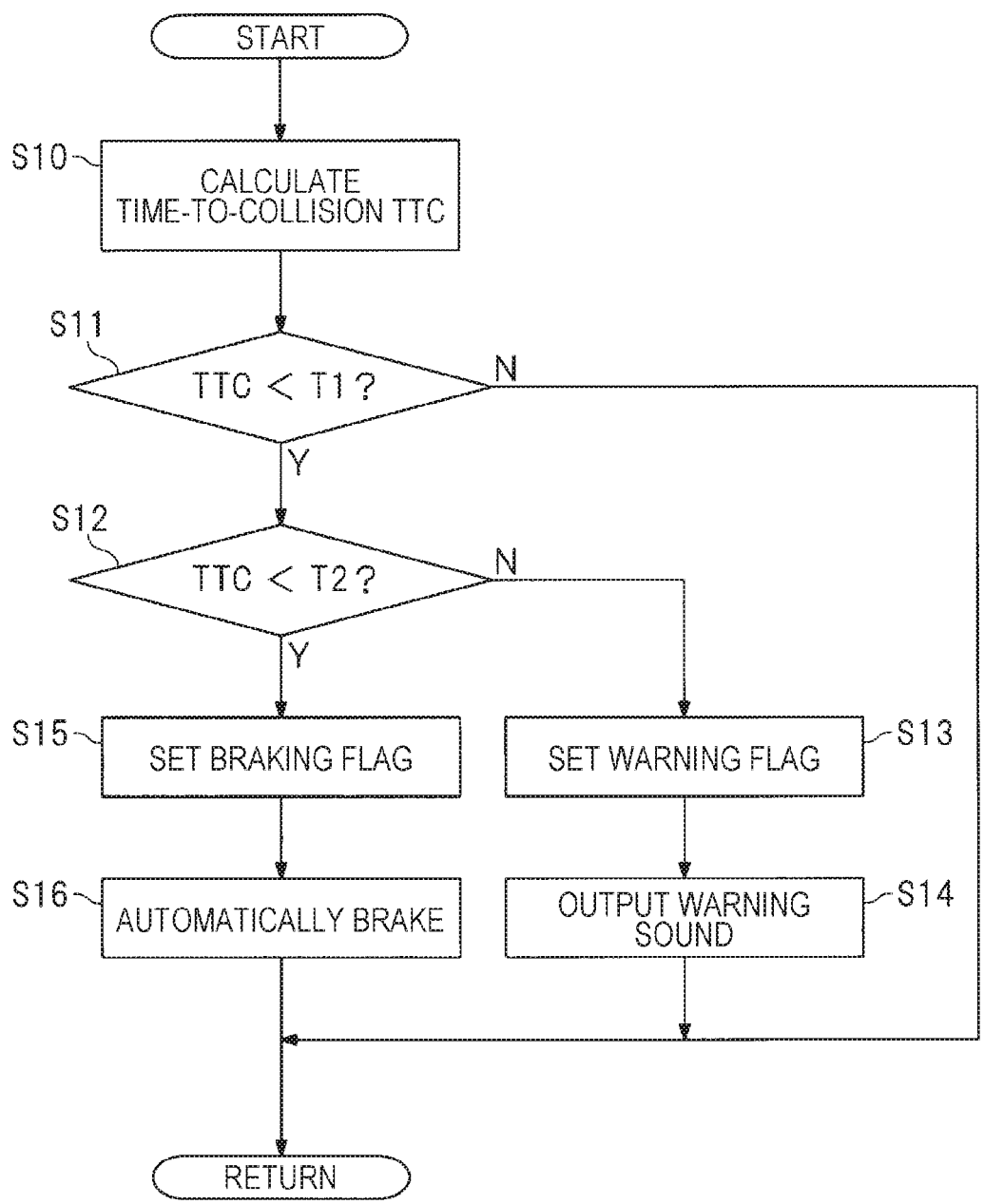
FIG. 6 is a flowchart of an example of a process of automatic braking control.
Figure 7:
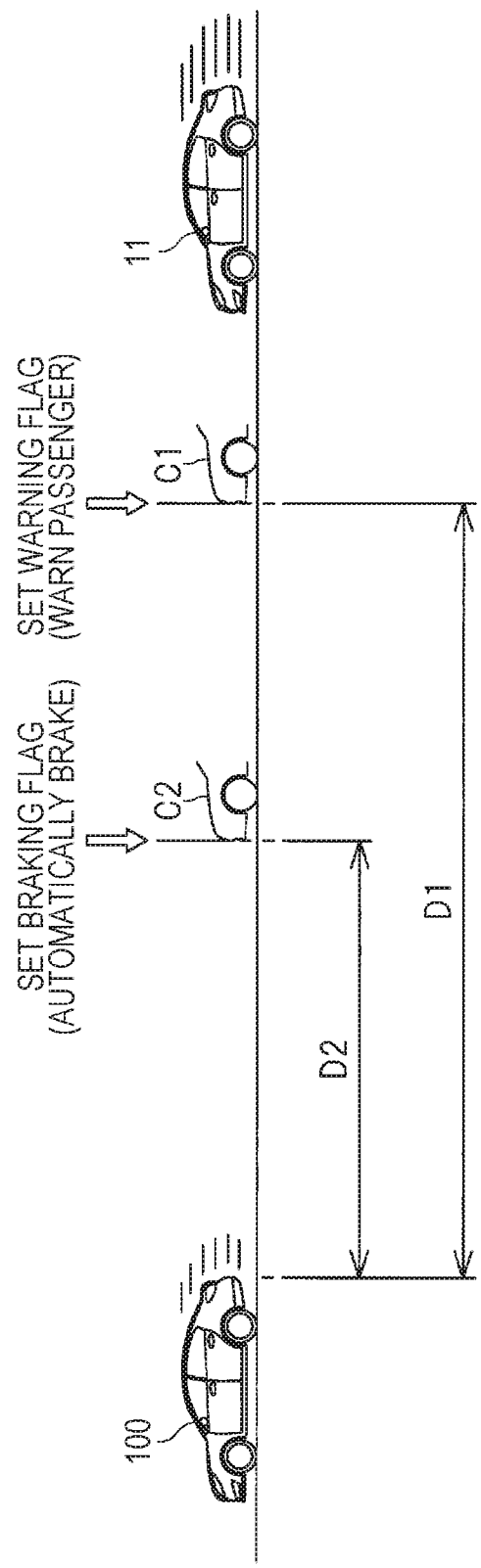
FIG. 7 illustrates a scene in which a vehicle is approaching a forward vehicle.

Next, a description will be given below of the automatic braking control to be performed by the main controller 70. FIG. 6 is a flowchart of an example of a process of the automatic braking control; FIG. 7 illustrates a scene in which the vehicle 11 is approaching the forward vehicle 100.

Referring to FIG. 6, at Step S10, the main controller 70 calculates a time-to-collision TTC, which is an index of a collision possibility, based on information received from the camera unit 84 and/or the radar unit 85. The time-to-collision TTC is defined as a value obtained by dividing the distance between the vehicle 11 and an object, or the forward vehicle 100 in this case, by the speed of the vehicle 11 relative to that of the forward vehicle 100. In other words, the time-to-collision TTC is defined as a time in which the vehicle 11 would collide with the forward vehicle 100 if a present relative speed of the vehicle 11 is constant. A shorter time-to-collision TTC indicates that a possibility that the vehicle 11 will collide with the forward vehicle 100 is higher. In other words, a longer time-to-collision TTC indicates a possibility that the vehicle 11 will collide with the forward vehicle 100 is lower. The object with which the vehicle 11 would collide may be a vehicle, as well as a bicycle, a pedestrian, or a structure.

At Step S11, the main controller 70 determines whether the time-to-collision TTC is shorter than a first time T1. When determining that the time-to-collision TTC is shorter than the first time T1 (Y at Step S11), the main controller 70 proceeds to Step S12, at which the main controller 70 determines whether the time-to-collision TTC is shorter than a second time T2; the second time T2 is shorter than the first time T1. When determining that the time-to-collision TTC is not shorter than the second time T2, namely, the time-to-collision TTC falls within the range between the second time T2 and the first time T1 (N at Step S12), the main controller 70 proceeds to Step S13, at which the main controller 70 sets a warning flag. Then, at Step S14, the main controller 70 causes a horn to output a warning sound toward the occupant. In this situation, the vehicle 11 keeps a distance D1 to the forward vehicle 100 as indicated by the arrow C1 in FIG. 7, but there is still a possibility that the distance D1 decreases until the collision occurs. For this reason, the main controller 70 causes the horn to output the warning sound. In short, when the time-to-collision TTC is shorter than the first time T1, namely, when the possibility that the vehicle 11 will collide with the forward vehicle 100 is higher than a first threshold, the main controller 70 causes the horn to output the warning sound in response to the warning flag, thereby informing the occupant that the vehicle 11 is approaching the forward vehicle 100. In one embodiment, the warning flag may serve as a # first warning signal #. Instead of outputting the warning sound, for example, the main controller 70 may switch on or flash warning lamps in order to inform the occupant that the vehicle 11 is approaching the forward vehicle 100.

When the time-to-collision TTC is shorter than the second time T2 (Y at Step S12 in FIG. 6), the main controller 70 proceeds to Step S15, at which the main controller 70 sets a braking flag. Then, at Step S16, the main controller 70 actuates the brake actuator 45 sharply, thereby automatically braking to stop the vehicle 11. In this situation, a distance D2 between the vehicle 11 and the forward vehicle 100 is short, as indicated by the arrow C2 in FIG. 7. For this reason, the main controller 70 automatically brakes to reduce the risk of the vehicle 11 colliding with the forward vehicle 100. In short, when the time-to-collision TTC is shorter than the second time T2, namely, when the possibility that the vehicle 11 will collide with the forward vehicle 100 is higher than a second threshold, which is greater than the first threshold, the main controller 70 automatically brakes in response to the braking flag. In one embodiment, the braking flag may serve as a "collision alarm signal" or a "second warning signal".

In the above, the time-to-collision TTC is used as the index of the collision possibility; however, the distance between the vehicle 11 and an object may be used instead. A shorter distance between the vehicle 11 and the object indicates that a possibility that the vehicle 11 will collide with the forward vehicle 100 is higher. In other words, a longer distance between the vehicle 11 and the object indicates a possibility that the vehicle 11 will collide with the forward vehicle 100 is lower.

[Collaboration Control: Timing Chart]

As described above, when the vehicle 11 is approaching the forward vehicle 100, the main controller 70 sets the braking flag and then activates the brake actuator 45 sharply in order to reduce the risk of the collision. To automatically brake at an appropriate timing, the brake actuator 45 consumes a larger amount of electric power. It is accordingly necessary to supply a sufficiently large amount of electric power to the brake actuator 45. When the vehicle 11 switches its running mode from the motor mode to the parallel mode, namely, when the starter generator 18 is driven to start up the engine 12, the switch SW is kept off so that the first power supply system 61 is separated from the second power supply system 62. Thus, if the main controller 70 drives the brake actuator 45 rapidly in order to automatically brake and start up the engine 12 simultaneously, the electric power supplied to the brake actuator 45 may become insufficient. To avoid this power shortage, the control device 10 performs the collaboration control that will be described later.

Figure 8:
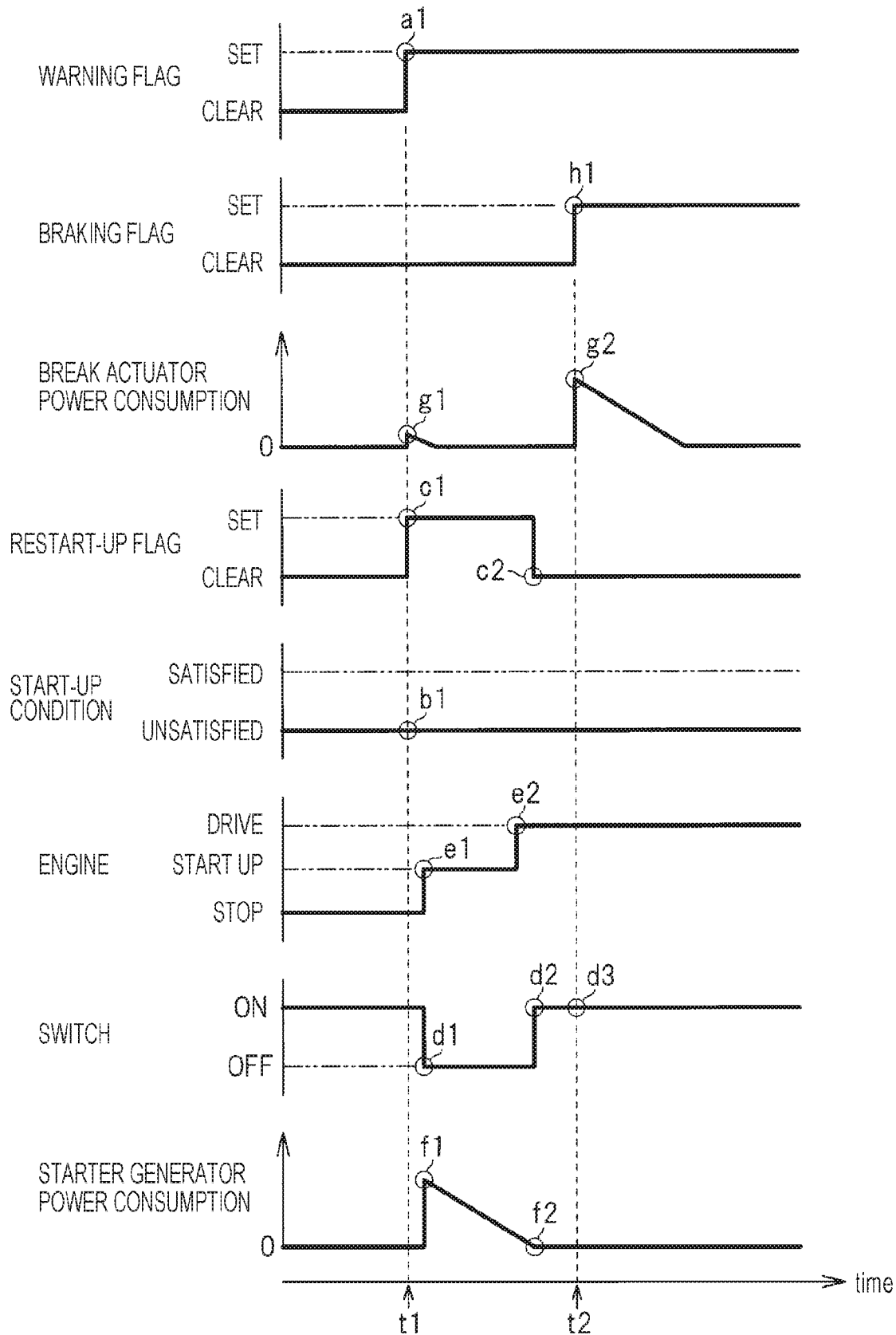
FIG. 8 is a timing chart of an example of collaboration control in pattern 1.
Figure 9:
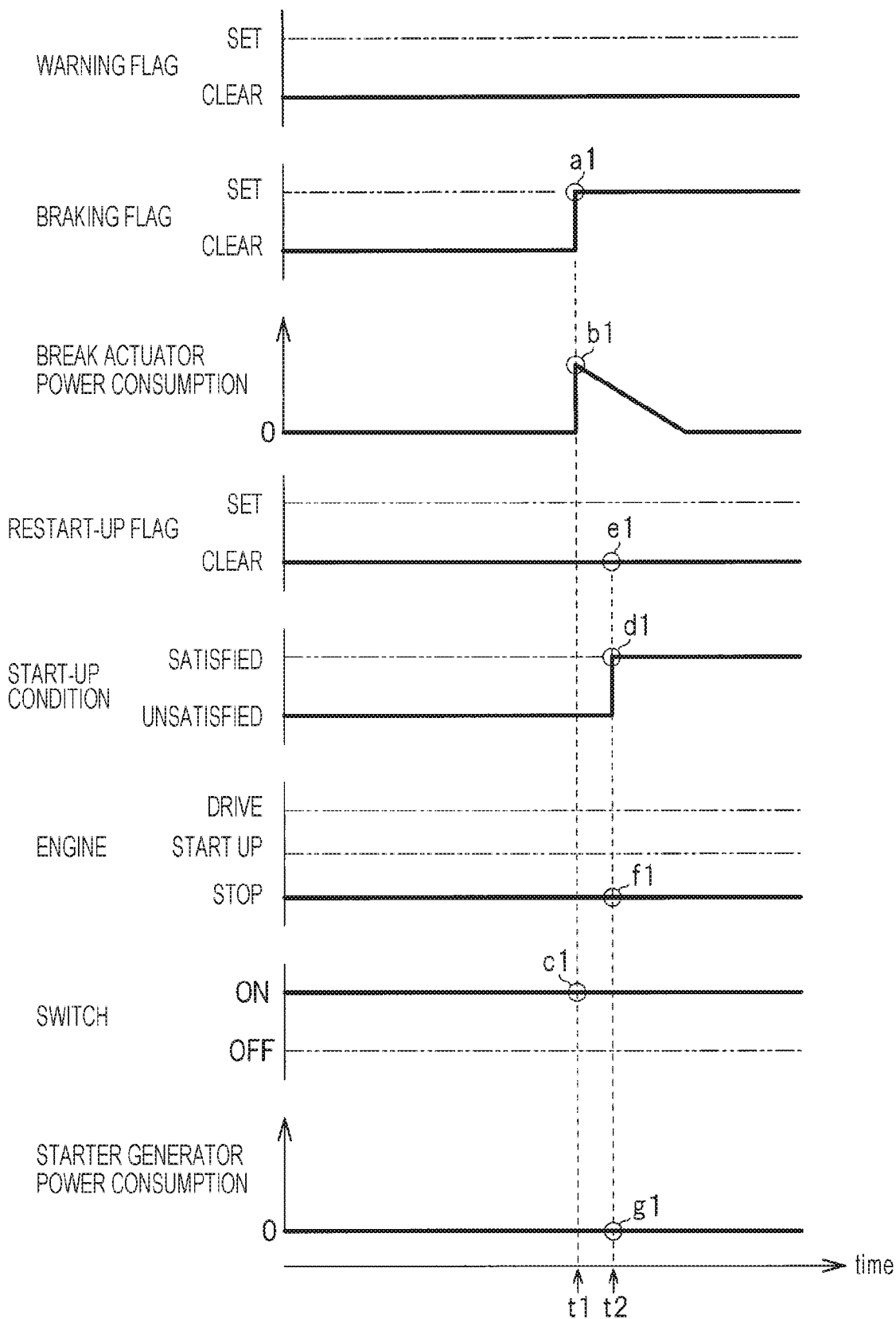
FIG. 9 is a timing chart of an example of the collaboration control in pattern 2.
Figure 10:
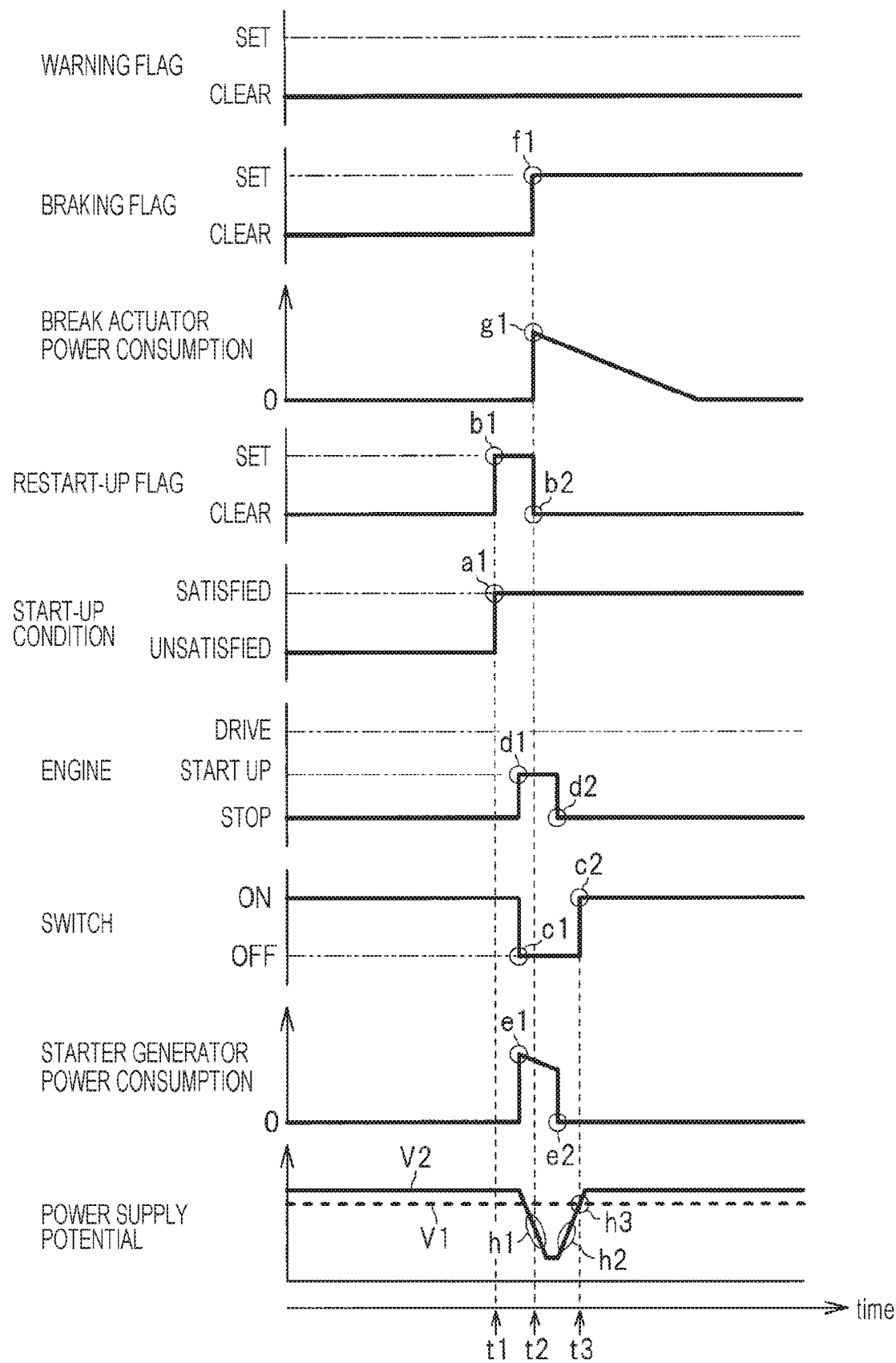
FIG. 10 is a timing chart of an example of the collaboration control in pattern 3.

A description will be given of the collaboration control to be performed by the main controller 70, with reference to the timing charts. FIG. 8 is a timing chart of an example of the collaboration control in pattern 1; FIG. 9 is a timing chart of an example of the collaboration control in pattern 2; and FIG. 10 is a timing chart of an example of the collaboration control in pattern 3. Pattern 1 in FIG. 8 is related to a situation in which the main controller 70 sets a warning flag during the stop of the engine 12; pattern 2 in FIG. 9 is related to a situation in which the main controller 70 sets a braking flag during the stop of the engine 12; and pattern 3 in FIG. 10 is related to a situation in which the main controller 70 sets a warning flag during the start-up of the engine 12. In FIGS. 8 to 10, when determining that the starter generator 18 starts up the engine 12, the main controller 70 sets a restart-up flag. When having completed or suspecting the start-up of the engine 12, the starter generator 18 clears the setting of the restart-up flag.

Pattern 1

The collaboration control in the pattern 1 will be described below. In the pattern 1, the main controller 70 sets a warning flag during the stop of the engine 12. This pattern is related to the situation in which the vehicle 11 is gradually approaching the forward vehicle 100 or the object. In this case, the vehicle 11 has been set to the motor mode where the engine 12 stops.

At a time t1 in FIG. 8, the main controller 70 sets a warning flag in response to the approaching of the vehicle 11 toward the forward vehicle 100 or the object, as indicated by a1. Although the start-up condition for the engine 12 is not satisfied at this moment as indicated by b1, the main controller 70 sets a restart-up flag to determine the start-up of the engine 12, as indicated by c1. Then, the main controller 70 turns off the switch SW, as indcted by d1, and sets the starter generator 18 to the power running state, thereby starting up the engine 12, as indicated by e1. As a result, the power consumption of the starter generator 18 rapidly increases, as indicated by f1.

After having started up, the engine 12 enters an operational state, as indicated by e2. In response, the main controller 70 clears the restart-up flag, as indicated by c2, and turns on the switch SW, as indicated by d2. Then, the starter generator 18 decreases its power running torque, and the power consumption of the starter generator 18 accordingly decreases to about zero, as indicated by f2. In this case, as indicated by g1, the brake actuator 45 slightly increases its power consumption in response to the setting of the warning flag as indicated by a1, because it is necessary for the brake actuator 45 to prepare for an automatic braking operation to be performed afterword.

At a time t2, the vehicle 11 is further approaching toward the forward vehicle 100 or the object. In response, the main controller 70 sets a braking flag, as indicated by h1, and the main controller 70 drives the brake actuator 45 in order to perform the automatic braking operation. As a result, the power consumption of the brake actuator 45 rapidly increases, as indicated by g2. When the brake actuator 45 is driven under the automatic braking control, the engine 12 has already started up and the switch SW is kept in the ON state, as indicated by d3, so that both the first power supply 51 and the second power supply 52 are coupled to the brake actuator 45. As a result, a sufficient amount of electric power is supplied to the brake actuator 45 so that the main controller 70 can perform the automatic braking control properly.

As described above, after having set the warning flag during the stop of the engine 12, the main controller 70 drives the starter generator 18 to start up the engine 12 regardless of whether the start-up condition for the engine 12 is satisfied, in other words, even while the vehicle 11 is running in the motor mode. In this way, the main controller 70 starts up the engine 12 before setting the braking flag, thereby automatically braking and starting up the engine 12 at different timings. Consequently, it is possible to supply a sufficient amount of electric power to the brake actuator 45 when the brake actuator 45 automatically brakes.

Pattern 2

The collaboration control in the pattern 2 will be described below. In the pattern 2, the main controller 70 sets a braking flag during the stop of the engine 12. This pattern is related to the situation in which a pedestrian or other object suddenly appears in front of the vehicle 11 running in the motor mode where the engine 12 stops.

At a time t1 in FIG. 9, the main controller 70 has already cleared the warning flag and in turn sets a braking flag, as indicated by a1. Then, the main controller 70 drives the brake actuator 45 in order to automatically brake. In response, the power consumption of the brake actuator 45 rapidly increases, as indicated by b1. When the brake actuator 45 is driven under the automatic braking control, the switch SW is kept in the ON state, as indicated by c1, so that both the first power supply 51 and the second power supply 52 are coupled to the brake actuator 45. Consequently, it is possible to supply a sufficient amount of electric power to the brake actuator 45, thereby causing the brake system 40 to operate properly.

After having set the braking flag during the stop of the engine 12, the main controller 70 prohibits the starter generator 18 from being driven. Hence, even if the start-up condition for the engine 12 is satisfied at a time t2, as indicated by d1, the main controller 70 does not set a restart-up flag, as indicated by e1, and the engine 12 continues to stop, as indicated by f1. In which case, the power consumption of the starter generator 18 is kept zero, as indicated by g1. Consequently, it is possible to supply a sufficient amount of electric power to the brake actuator 45, thereby performing the automatic braking control properly.

Pattern 3

The collaboration control in the pattern 3 will be described below. In the pattern 3, the main controller 70 sets a braking flag during the start-up of the engine 12. This pattern is related to the situation in which a pedestrian or other object suddenly appears in front of the vehicle 11 running during the start-up of the engine 12, namely, during the switching of the running mode from the motor mode to the parallel mode.

At a time t1 in FIG. 10, the start-up condition for the engine 12 is satisfied, as indicated by a1. In response, the main controller 70 sets a restart-up flag to determine the start-up of the engine 12, as indicated by b1. After having set the restart-up flag, the main controller 70 turns off the switch SW, as indicated by c1, and the starter generator 18 enters the power running state to start up the engine 12, as indicated by d1. As a result, the power consumption of the starter generator 18 rapidly increases, as indicated by e1. At a time t2, the main controller 70 sets a braking flag during the start-up of the engine 12, as indicated by f1. Then, the main controller 70 drives the brake actuator 45 in order to automatically brake. As a result, the power consumption of the brake actuator 45 rapidly increases, as indicated by g1.

If the brake actuator 45 automatically brakes and starts up the engine 12 simultaneously, the starter generator 18 consumes a larger amount of electric power, in which case the electric power supplied to the brake actuator 45 may become insufficient. To avoid this power shortage, when setting the braking flag during the start-up of the engine 12, as indicated by f1, the main controller 70 clears the restart-up flag, as indicated by b2, in order to stop the starter generator 18. As a result, the power running torque of the starter generator 18 decreases, and the power consumption of the starter generator 18 accordingly decreases to about zero, as indicated by e2.

The second power supply system 62 with the starter generator 18 has an electric potential V2, which decreases with the driving of the starter generator 18, as indicated by h1, and then increases in response to the stop of the starter generator 18, as indicated by h2. At a time t3, the electric potential V2 of the second power supply system 62 becomes equal to an electric potential V1 of the first power supply system 61, as indicated by h3, and then the switch SW is turned on, as indicated by c2. In this way, the main controller 70 turns on the switch SW after the electric potential V2 of the second power supply system 62 has exceeded the electric potential V1 of the first power supply system 61. Consequently, a sufficient amount of electric power is supplied to the brake actuator 45, because the electric power supplied from the first power supply system 61 to the second power supply system 62 is blocked.

Figure 11:
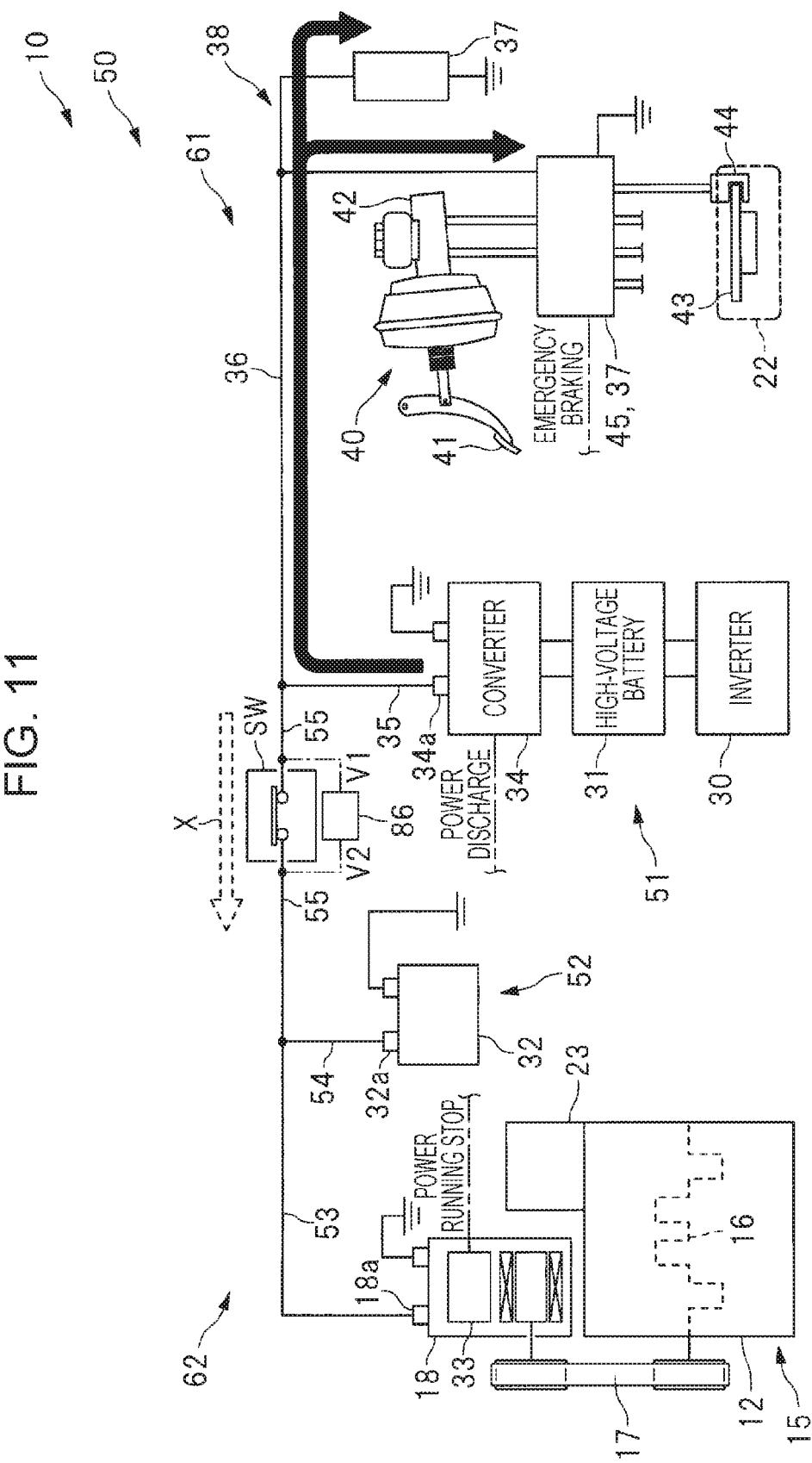
FIG. 11 illustrates an example of a power supply status at the time t3 in FIG. 10.

FIG. 11 illustrates an example of the power supply status at the time t3 in FIG. 10. As illustrated in FIG. 11, when setting the braking flag during the start-up of the engine 12, namely, during the driving of the starter generator 18, the main controller 70 instructs the brake actuator 45 to automatically brake for emergency and also instructs the starter generator 18 to terminate the power running state. Then, when the electric potential V2 of the second power supply system 62 exceeds the electric potential V1 of the first power supply system 61, the main controller 70 turns on the switch SW. In this way, the main controller 70 turns on the switch SW based on the difference between the electric potential V1 of the first power supply system 61 and the electric potential V2 of the second power supply system 62. Consequently, the first power supply system 61 can supply a sufficient amount of electric power to the brake actuator 45 in response to the turn-on of the switch SW, with the electric power supplied from the first power supply system 61 to the second power supply system 62, as indicated by the broken arrow X, blocked. In this case, it is obvious that the low-voltage battery 32 may also supply the electric power to the brake actuator 45 via the switch SW, depending on an operational state of the brake actuator 45.

As described above, the main controller 70 turns on the switch SW after the electric potential V2 of the second power supply system 62 has exceeded the electric potential V1 of the first power supply 51. However, the main controller 70 may turn on the switch SW at any given timing when the first power supply system 61 does not discharge a large amount of electric power. Alternatively, the main controller 70 may turn on the switch SW when the electric potential V2 becomes equal to the electric potential V1 or when the difference between the electric potential V2 and the electric potential V1 becomes equal to or less than a preset value. In short, the main controller 70 may turn on the switch SW based on the difference between the electric potentials V1 and V2 in any situation where the first power supply system 61 does not discharge a large amount of electric power.

The electric potential V1 of the first power supply system 61 and the electric potential V2 of the second power supply system 62 can be detected with the switch sensor 86. However, the electric potentials V1 and V2 may be detected with another sensor, controller, or member. Alternatively, a discharge voltage of the converter 34 which the converter 34 transmits to the main controller 70 may be used as the electric potential V1 of the first power supply system 61. In addition, a terminal voltage of the low-voltage battery 32 which the battery sensor 88 transmits to the main controller 70 may be used as the electric potential V2 of the second power supply system 62.

[Collaboration Control: Flowchart]

Figure 12:
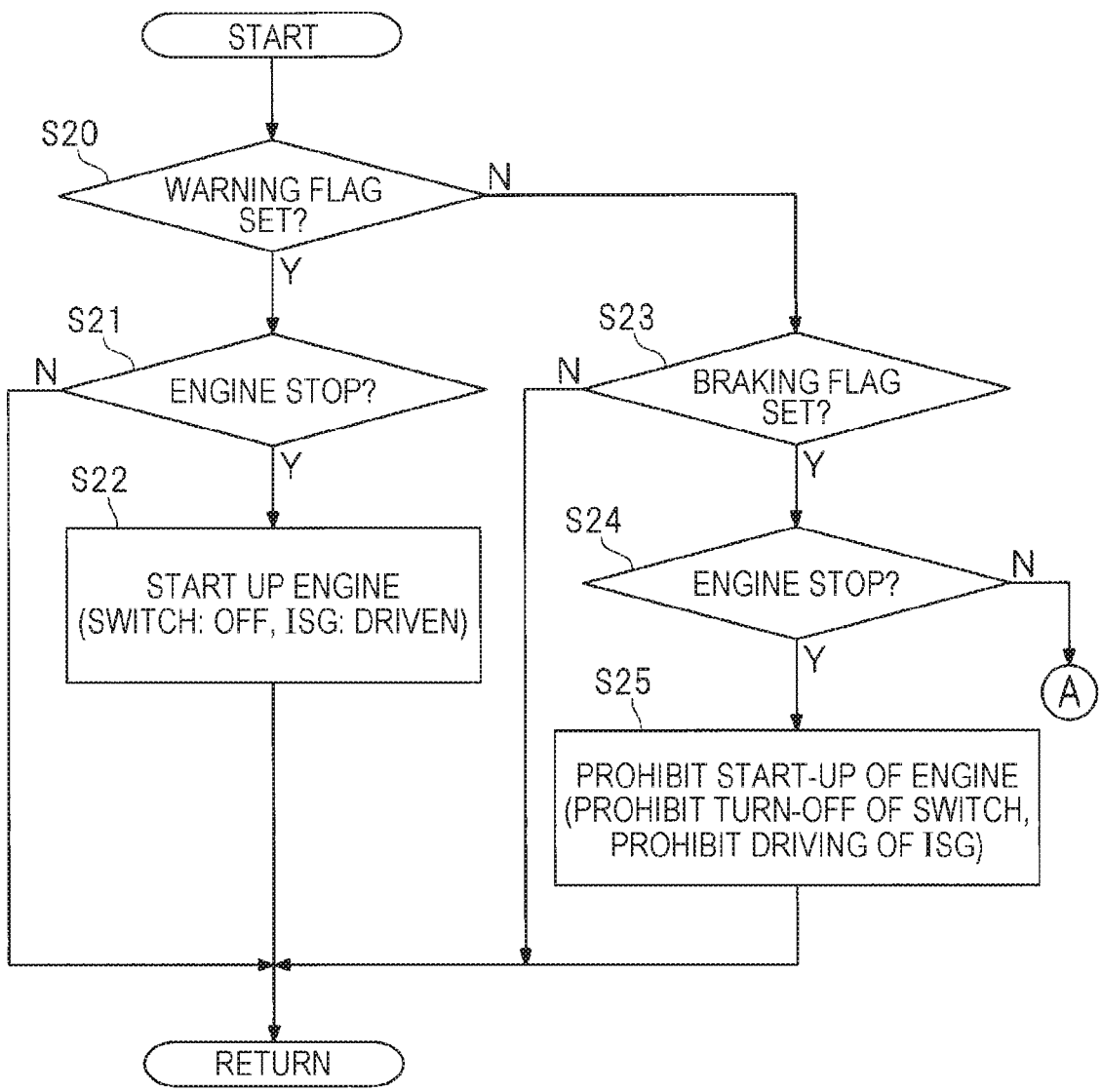
FIG. 12 is a first flowchart of an example of a process of the collaboration control.
Figure 13:
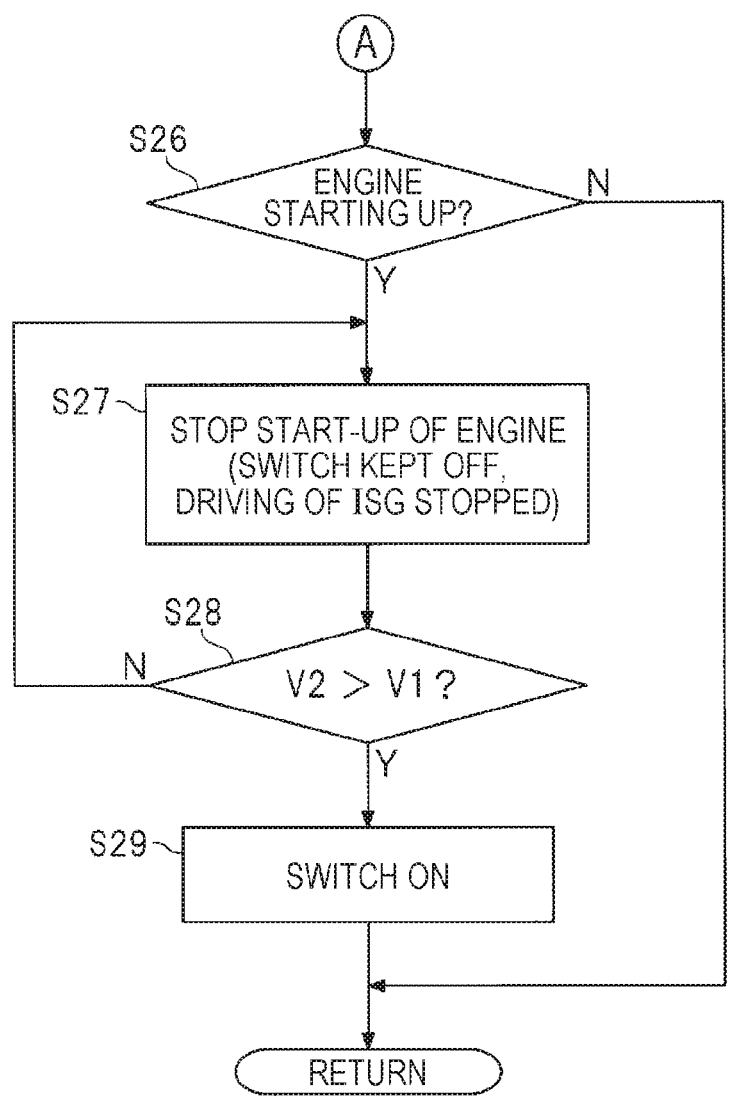
FIG. 13 is a first flowchart of an example of the process of the collaboration control.

A process of the collaboration control illustrated in FIGS. 8 to 10 will be described with reference to the flowcharts. FIG. 12 is a first flowchart of an example of the process of the collaboration control; FIG. 13 is a second flowchart of the example of the process of the collaboration control. The first flowchart is continued to the second flowchart via the mark A.

Referring to FIGS. 12 and 13, at Step S20, the main controller 70 determines whether a warning flag is set under the automatic braking control. When determining that the warning flag is set (Y at Step S20), the main controller 70 proceeds to Step S21, at which the main controller 70 determines whether the engine 12 is stopping. When determining that the engine 12 is stopping (Y at Step S21), the main controller 70 proceeds to Step S22, at which the starter generator 18 starts up the engine 12. In short, when the warning flag is set during the stop of the engine 12, the main controller 70 drives the starter generator 18 regardless of whether the start-up condition is satisfied. Since the main controller 70 starts up the engine 12 and automatically brakes at different timings, the main controller 70 successfully supplies a sufficient amount of electric power to the brake actuator 45 in the brake system 40. Consequently, the brake system 40 can operate properly.

When determining that the warning flag is cleared (N at Step S20), the main controller 70 proceeds to Step S23, at which the main controller 70 determines whether a braking flag is set. When determining that the braking flag is set (Y at Step S23), the main controller 70 proceeds to Step S24, at which the main controller 70 determines whether the engine 12 is stopping. When determining that the engine 12 is stopping (Y at Step S24), the main controller 70 proceeds to the Step S25, at which the main controller 70 prohibits the starter generator 18 from starting up the engine 12. In short, when the braking flag is set during the stop of the engine 12, the main controller 70 prohibits the starter generator 18 from being driven regardless of whether the start-up condition is satisfied, so that the power consumption of the starter generator 18 decreases. Consequently, it is possible to supply a sufficient amount of electric power to the brake actuator 45, thereby causing the brake system 40 to operate properly.

When determining that the engine 12 is not stopping (N at Step S24), the main controller 70 proceeds to Step S26 in FIG. 13, at which the main controller 70 determines whether the engine 12 is starting up. When determining that the engine 12 is starting up, namely, that the braking flag is set during the start-up of the engine 12 (Y at Step S26), the main controller 70 proceeds to Step S27, at which the main controller 70 stops driving the starter generator 18 with the switch SW kept in the OFF state, thereby stopping the start-up of the engine 12. At Step S28, the main controller 70 determines whether the electric potential V2 of the second power supply system 62 is higher than the electric potential V1 of the first power supply system 61. When determining that the electric potential V2 is higher than the electric potential V1 (Y at Step S28), the main controller 70 proceeds to Step S29, at which the main controller 70 turns on the switch SW. In this way, the main controller 70 turns on the switch SW after the electric potential V2 of the second power supply system 62 has exceeded the electric potential V1 of the first power supply system 61. This operation reduces the risk of an electric current flowing from the first power supply system 61 to the second power supply system 62 in response to the turn-on of the switch SW. Consequently, it is possible to supply a sufficient amount of electric power to the brake actuator 45, thereby causing the brake system 40 to operate properly.

The foregoing embodiment of the disclosure may be modified in various ways within the scope of the claims. The vehicle 11 illustrated in FIG. 1 is a hybrid vehicle that includes the engine 12 and the motor generator 13 that serve as respective power sources. However, the vehicle 11 may be any other type of vehicle. Alternatively, the vehicle 11 may be a vehicle that includes: the engine 12 that serves as a power source; and an idling stop system that automatically starts up or stops the engine 12.

In the foregoing embodiment, the control device 10 includes the brake actuator 45 that automatically brakes, as an electrical actuator in a drive assist device. However, the electrical actuator is not limited to the brake actuator 45. Alternatively, the electrical actuator in the drive assist device may be a steering actuator that automatically operates a steering rack or other member to avoid the collision of the vehicle 11 with an object. Furthermore, although the starter generator 18 in the control device 10 generates electric power, as a starter motor, as well as starting rotating the engine 12, the starter generator 18 may simply generate electric power.

The control device 10 illustrated in FIG. 2 includes the converter 34 that decreases a direct current (DC) voltage of the high-voltage battery 31 which is lower than the voltage of the low-voltage battery 32; however, the converter 34 does not necessarily have to be provided in the first power supply 51. In this case, the control device 10 may be designed such that the difference in voltage between the high-voltage battery 31 and the low-voltage battery 32 that are directly interconnected in parallel is set to a preset value or less.

As described above, the high-voltage battery 31 may be a lithium ion battery or a lead battery with a terminal voltage of about 100 V; however, the high-voltage battery 31 may be of any other type. Alternatively, the high-voltage battery 31 may be a battery with a terminal voltage other than 100 V or a capacitor or other type of battery. Likewise, the low-voltage battery 32 may be a lithium ion battery or a lead battery with a terminal voltage of about 12 V; however, the low-voltage battery 32 may be of any other type. Alternatively, the low-voltage battery 32 may be a battery with a terminal voltage other than 12 V or a capacitor or other type of battery.

As described above, all of the mode setting unit 71, the engine controller 72, the motor controller 73, the ISG controller 74, the converter controller 75, the switch controller 76, the clutch controller 77, the collision predictor 78, the alarm controller 79, and the brake controller 80 are provided in the main controller 70; however, the configuration of these members is not limited. Alternatively, the mode setting unit 71, the engine controller 72, the motor controller 73, the ISG controller 74, the converter controller 75, the switch controller 76, the clutch controller 77, the collision predictor 78, the alarm controller 79, and the brake controller 80 are provided in another controller or separately in a plurality of controllers.

According to the embodiment of the disclosure, the control device 10 stops driving the starter generator 18 in the second power supply system 62 in response to a braking flag so that an electric potential V2 of the second power supply system 62 increases. Then, based on the difference between the electric potential V2 and the electric potential V1 of the first power supply system 61, the control device 10 turns on the switch SW to couple the first power supply system 61 to the second power supply system 62 or turns off the switch SW to separate the first power supply system 61 from the second power supply system 62. In this way, the control device 10 successfully supplies a sufficient amount of electric power to the brake actuator 45 in the brake system 40, thereby causing the brake system 40 to operate properly.

The invention claimed is:

1. A control device to be installed in a vehicle, the control device being configured to predict a collision of the vehicle with an object and then actuates a drive assist device and comprising:
 a collision predictor configured to, when a possibility that the vehicle will collide with the object exceeds a threshold, output a collision alarm signal;
 a drive assist controller configured to, when the collision alarm signal is output from the collision predictor, actuate an electrical actuator in the drive assist device;
 an engine controller configured to, when a stop condition is satisfied, stop an engine and, when a start-up condition is satisfied, drive a starter motor to start up the engine;
 a first power supply system comprising a first power supply and the electrical actuator coupled to the first power supply, the first power supply including a first power storage;
 a second power supply system comprising a second power supply and the starter motor coupled to the second power supply, the second power supply including a second power storage;
 a switch configured to be turned on or off, the switch being disposed between the first power supply system and the second power supply system; and
 a switch controller configured to, when the starter motor is driven to start up the engine, turn off the switch, wherein
 when the collision alarm signal is output during driving of the starter motor, the engine controller stops the starter motor to increase an electric potential of the second power supply system, and the switch controller turns on the switch, based on a difference between the electric potential of the second power supply system and an electric potential of the first power supply system.

2. The control device according to claim 1, wherein when the collision alarm signal is output during the driving of the starter motor, the switch controller turns on the switch after the electric potential of the second power supply system has exceeded the electric potential of the first power supply system.

3. The control device according to claim 1, wherein when the possibility that the vehicle will collide with the object exceeds a first threshold, the collision predictor outputs a first warning signal,
 when the possibility that the vehicle will collide with the object exceeds a second threshold, the collision predictor outputs a second warning signal as the collision alarm signal, the second threshold being higher than the first threshold,
 when the first warning signal is output during a stop of the engine, the engine controller drives the starter motor regardless of whether the start-up condition is satisfied, and
 when the second warning signal is output during the stop of the engine, the engine controller prohibits the starter motor from being driven regardless of whether the start-up condition is satisfied.

4. The control device according to claim 2, wherein when the possibility that the vehicle will collide with the object exceeds a first threshold, the collision predictor outputs a first warning signal,
 when the possibility that the vehicle will collide with the object exceeds a second threshold, the collision predictor outputs a second warning signal as the collision alarm signal, the second threshold being higher than the first threshold,
 when the first warning signal is output during a stop of the engine, the engine controller drives the starter motor regardless of whether the start-up condition is satisfied, and
 when the second warning signal is output during the stop of the engine, the engine controller prohibits the starter motor from being driven regardless of whether the start-up condition is satisfied.

5. The control device according to claim 3, wherein when the first warning signal is output from the collision predictor, the drive assist controller notifies an occupant that the vehicle is approaching the object.

6. The control device according to claim 4, wherein when the first warning signal is output from the collision predictor, the drive assist controller notifies an occupant that the vehicle is approaching the object.

7. The control device according to claim 1, wherein a voltage of the first power storage is higher than a voltage of the second power storage, and
 the first power supply comprises a converter configured to convert the voltage of the first power supply.

8. The control device according to claim 2, wherein a voltage of the first power storage is higher than a voltage of the second power storage, and
 the first power supply comprises a converter configured to convert the voltage of the first power supply.

9. The control device according to claim 3, wherein a voltage of the first power storage is higher than a voltage of the second power storage, and
 the first power supply comprises a converter configured to convert the voltage of the first power supply.

10. The control device according to claim 4, wherein a voltage of the first power storage is higher than a voltage of the second power storage, and
 the first power supply comprises a converter configured to convert the voltage of the first power supply.

11. The control device according to claim 5, wherein a voltage of the first power storage is higher than a voltage of the second power storage, and
 the first power supply comprises a converter configured to convert the voltage of the first power supply.

12. The control device according to claim 6, wherein a voltage of the first power storage is higher than a voltage of the second power storage, and
 the first power supply comprises a converter configured to convert the voltage of the first power supply.

13. A control device to be installed in a vehicle, the control device being configured to predict a collision of the vehicle with an object and then actuates a drive assist device, and comprising:
 a first power supply system comprising a first power supply and an electrical actuator coupled to the first power supply, the first power supply including a first power storage;
 a second power supply system comprising a second power supply and a starter motor coupled to the second power supply, the second power supply including a second power storage;
 a switch configured to be turned on or off, the switch being disposed between the first power supply system and the second power supply system; and
 circuitry configured to when a possibility that the vehicle will collide with the object exceeds a threshold, output a collision alarm signal, when the collision alarm signal is output from the collision predictor, actuate an electrical actuator in the drive assist device, when a stop condition is satisfied, stop an engine and, when a start-up condition is satisfied, drive the starter motor to start up the engine, and when the starter motor is driven to start up the engine, turn off the switch, wherein when the collision alarm signal is output during driving of the starter motor, the circuitry stops the starter motor to increase an electric potential of the second power supply system, and turns on the switch, based on a difference between the electric potential of the second power supply system and an electric potential of the first power supply system.

* * * * *